Figure 5:
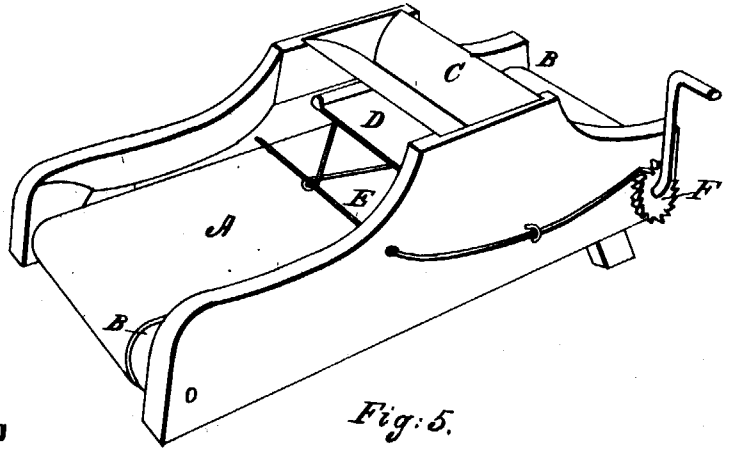

2 Sheets—Sheet 1.
L. BUTLER.
Machine for Separating Round Seed from Grain.
No. 7. Reissued March 8, 1839.
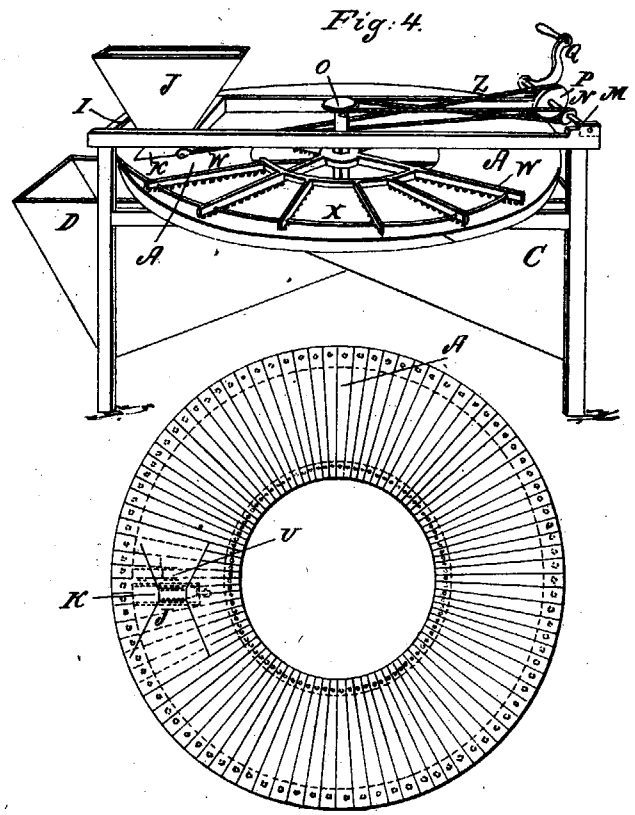
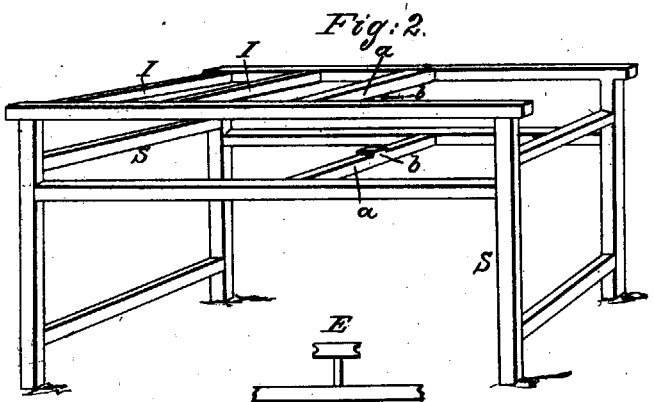
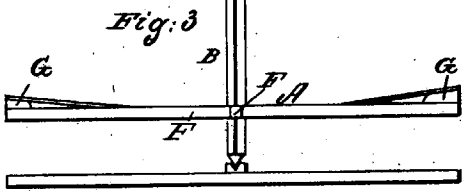
N. PETERS. Photo-Lithographer. Washington, D. C.

209. CLASSIFYING, SEPARATING, AND ASSORTING SOLIDS.

114

Cross Reference

Examiner

2 Sheets—Sheet 2.

L. BUTLER.

Machine for Separating Round Seed from Grain.

No. 7.

Reissued March 8, 1839.

BEST AVAILABLE COPY

UNITED STATES PATENT OFFICE.

LESTER BUTLER, OF COBLESKILL, NEW YORK.

IMPROVEMENT IN THE MACHINE FOR SEPARATING WILD PEAS OR OTHER ROUND SEEDS FROM GRAIN.

Specification forming part of Letters Patent No. 225, dated June 3, 1837; Reissue No. 7, dated March 8, 1839.

*To all whom it may concern:*

Be it known that I, LESTER BUTLER, of Cobleskill, in the county of Schoharie and State of New York, have invented a new and Improved Mode of Separating Wild Peas or other Round Seeds from Grain, of which I do hereby declare the following to be a full and exact description, reference being had to the annexed drawings.

The nature of my invention consists of a revolving inclined plane, A, Figure 1, constructed with sufficient inclination to project all round seeds over the inclined plane to the lower side or place, where the same are discharged or separated from the grain by a single revolution of the inclined plane, the grain at the same time being carried to the place where it is discharged into a receiver prepared for that purpose. This inclined plane may be constructed in the form of a wheel, as herein described, or by an inclined plane, A, constructed of cloth, leather, or any other suitable material, passing around two or more rollers, B B, similar in form to those used as feeders for carding or thrashing machines, and inclined to the right, left, or endwise, as a revolving inclined plane in any shape will produce the same effect by giving it a proper inclination, which is about one foot to four, which may be varied to suit the builder or user, and as to size the larger or more surface it has in all cases the faster it will clean. If inclined endwise, I generally place the hopper C and shoe D about one-fourth the length of the machine from the upper end, the outlet of the shoe being nearly the whole width of the plane. This may be kept in motion by a rod, E, running from the neck of the shoe to the outside of one of the timbers in which the rollers run, and from thence along the said timber to a rag or notched wheel, F, which, when in motion, will cause a vibration or jar of the shoe, and thus scatter the grain upon the plane, when all round seeds will immediately roll to the lowest part of the plane, where they are discharged, while the grain or seeds that are not round will remain upon the plane until discharged by the revolution thereof. If the inclination be to the right or left, the machine may be fed in any of the usual forms of grain-feeders, at or near one end and at the upper side. The round seeds in this case will roll off at the lower side, while the grain will pass on to the end opposite where it is let on, and there by the revolution of the plane be discharged.

In order that others may be enabled to make and use my invention, I will proceed to describe the construction and operation of the one I have in use, corresponding with the model.

In the first place I prepare a frame, S, Figs. 2 and 4, six feet in length, two and a half in width, and four feet in height, within the timbers of frame-work, which should be made of any suitable materials, size at least two by three inches. It has four posts—two at either end, one near the top and the other near the bottom of the posts; also, on either side, two pieces are framed in near the center of the posts, and the other on the top of the same across the frame. At the center I place two pieces, *a a*—one above and one below—of sufficient strength to support the wheel. On the center of these insert boxes *b b*, of any suitable material.

Figure 6:
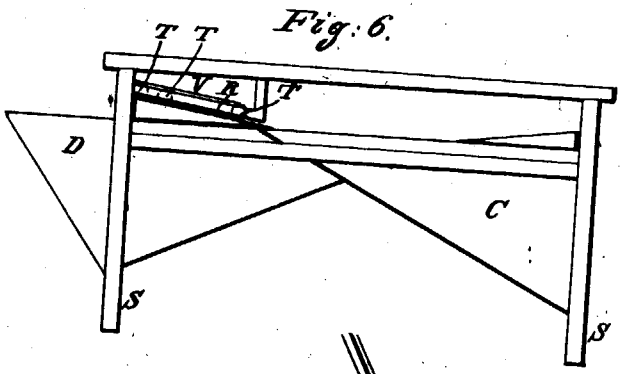
Figure 7:
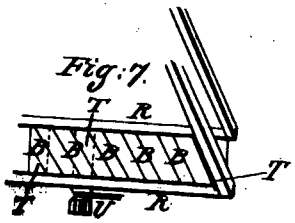

In order to form receivers, D C, Figs. 4 and 6, for the grain and round seeds separately, I place one end of the bottom for the right-hand receiver on the lower timber at the right of the frame, elevating the other to the lower cross-timber, in which the box is inserted, and extend it far enough past the center to receive whatever may be discharged through the eye of the wheel. The bottom for the left receiver I place on the lower timber at the left of the frame, one end fastened to the timber in the center with the bottom of the right receiver C, which forms an inclination from the center to the ends of about one foot and four inches. In addition to this I fit in boards at the sides and ends with slides for the purpose of drawing off the grain. I prepare a shaft, H, of, say, six inches in diameter, with a gudgeon in one end to run in the upper box. In the other I place a point or pivot to run on the lower box. Through this shaft I frame or lock four or more arms, F, of sufficient length to form a circle equal to the size of the wheel A—suppose six feet. At the extremity of these arms place fellies, which form the outer periphery of the wheel. This rim I raise by means of blocks G, about four inches above the level of the arm at the shaft. About two feet and three inches round the shaft I put a second set of fellies on a level with the arms,

BEST AVAILABLE COPY which produces the required inclination or dip of the wheel, the surface of which, whether of the naked boards or covered with tin or sheet iron, should have a smooth hard surface. This wheel has a horizontal motion from left to right. On the left are two pieces, I I, of timber of suitable dimensions, forming a square to receive the hopper J, the outlet of which is placed in a shoe, K, similar to those used for the like purpose in flouring-mills. This shoe is suspended from the upper framework by a wire. On the opposite end of the machine I place a shaft, L, horizontally across the top, running in boxes of wood or metal. On the center of this shaft is a pulley, N, of three inches in diameter, around which a rope, Y, or strap passes to a pulley, O, of one foot diameter, on the upper end of the upright shaft H; also, another pulley, P, on this same shaft, about seven inches to the right of the small one, of about one foot diameter. On one end of this shaft is a crank, Q, at which place, should the machine be propelled by water, it would be proper to put a pulley to run by cord or strap. At the left end of the machine, nearly under the hopper, I place a frame, R, for the brushes B, composed of two pieces, which lead from the upper timber at the left end of the machine to the eye of the wheel, where these should be framed in uprights, fastening them to one of the timbers forming the square sustaining the hopper. These timbers are placed about seven inches apart, in which I place three rollers, T—one at the outside, one at the inside, and the third, U, about six inches from the greatest circumference of the wheel. This last roller has in the end nearest the hopper and shoe small irons which, when in motion, come in contact with the neck of the shoe and cause the grain to desend from the hopper onto the height of the inclined plane. Around these rollers I place a strap of leather, V, on which I fasten strips of sheep's pelt, which serves as a brush, for the purpose of removing the grain from the wheel. I also place a number of leather rakes, W, on the wheel for the purpose of displacing the grain on its course to the place where it is discharged. These are fastened by means of a wire passing from one to the other near the outer ends and hooked at the left-hand corner. The other ends are kept in their place by means of a semicircle, X, suspended from the upper timbers with stays on the under side.

What I claim as my invention, and desire to secure by Letters Patent, is—

The principle of separating round seeds from grain by means of a revolving inclined plane, in the manner substantially as herein described.

LESTER BUTLER.

Witnesses:
THOMAS SMITH,
GEO. W. PORTER, Jr.